Feb. 3, 1942.                H. W. LINK                 2,271,739
                       SPRING TESTING MACHINE
                       Filed Jan. 31, 1940           3 Sheets-Sheet 2
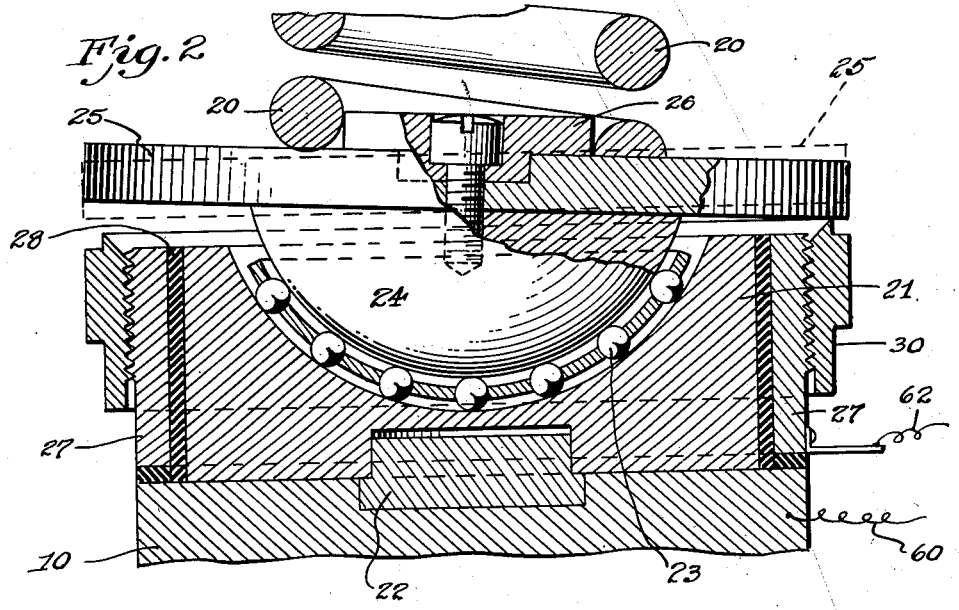
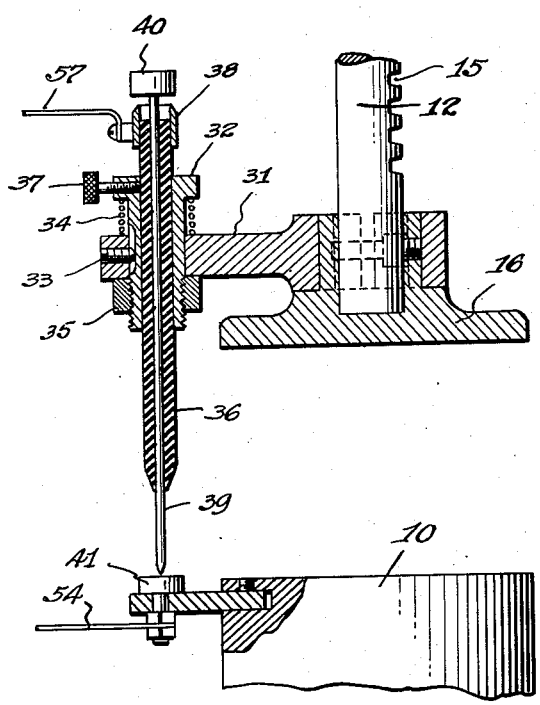
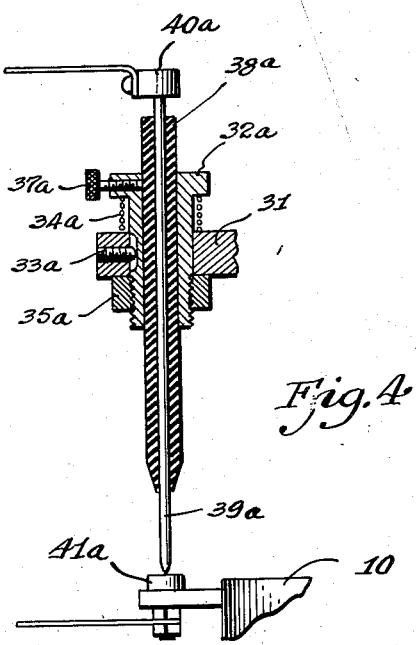
INVENTOR.
Herbert W. Link
BY Barnes, Kisselle, Laughlin & Raisch
ATTORNEYS Patented Feb. 3, 1942

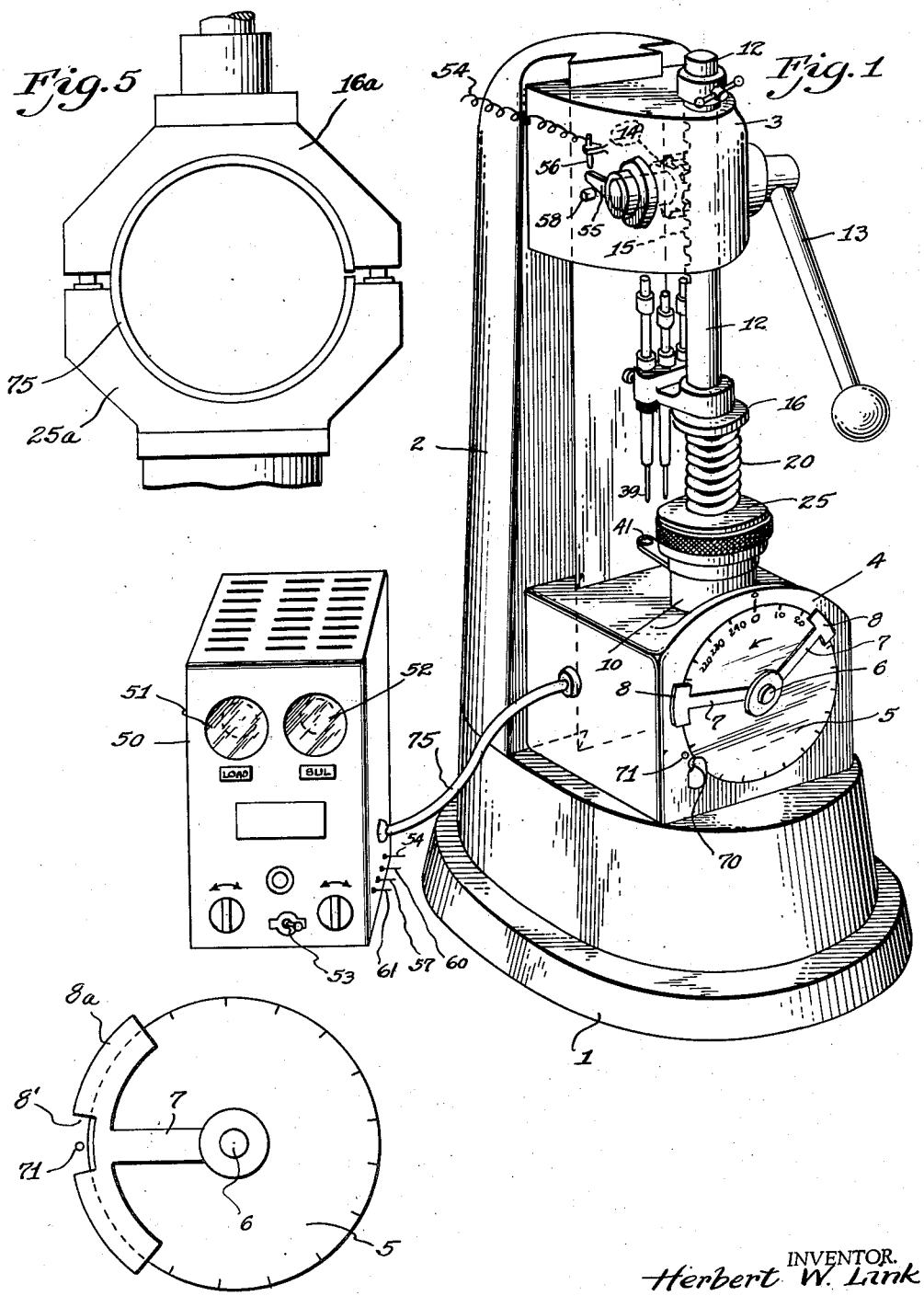

2,271,739

UNITED STATES PATENT OFFICE 2,271,739

SPRING TESTING MACHINE

Herbert W. Link, Detroit, Mich.

Application January 31, 1940, Serial No. 316,624

2 Claims. (Cl. 177—311)

This invention relates to a device for testing springs. While the device is particularly useful in the testing of coil springs, it may also be used for testing other flexible elements such, for example, as engine piston rings.

The general objects of the invention are to provide an improved device possessing great accuracy and capable of easy operation and which will test not only the capacity of the spring at loaded positions, but will also test the spring, particularly a coil spring, as to so-called squareness. For example, coiled valve springs of an engine should exert, at their best, certain loads at definite degrees of flexure and the spring should be what is commonly called as square, in that when under load the forces exerted thereby are substantially truly axial and not at an angle to its axial direction. It will be seen that a spring which exerts an angular load might deleteriously affect the operation of a valve stem of an engine.

An arrangement for carrying out the invention is disclosed in the accompanying drawings wherein Fig. 1 is a perspective view of an apparatus constructed in accordance with the invention with some parts shown in broken lines.

Fig. 2 is an enlarged cross sectional view taken through the spring support.

Fig. 3 is a detailed view illustrating an electrical contact arrangement.

Fig. 4 is a detailed sectional view illustrating another electrical contact arrangement.

Fig. 5 is a view illustrating an arrangement for the testing of a piston ring.

Fig. 6 is a view of a modified form of indicating mechanism.

Figure 7:
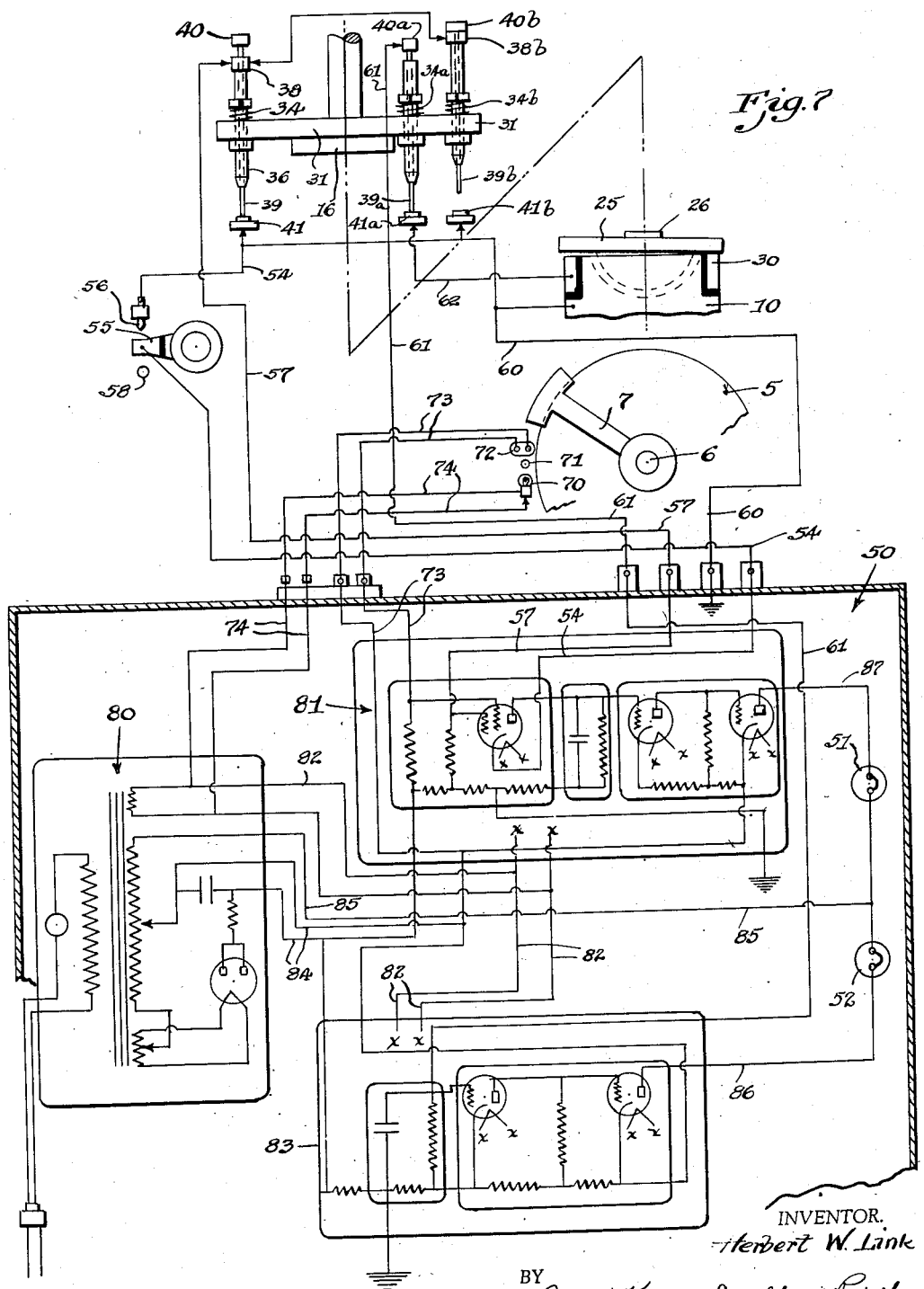
Fig. 7 is a diagrammatic view of the wiring layout.

The machine as shown herein comprises a base 1, a standard 2, and a head 3, and on the base is a support or covering 4 within which is disposed a suitable weighing mechanism (not shown). Suffice it to say that the weighing mechanism is equipped with a movable indicator such as a dial 5 rotatable around an axis 6, and associated with the dial are members 7 which have heads 8 capable of rotatable adjustment relative to the dial but normally moving therewith. A post 10 projects from the casing 4 and constitutes the means for placing the load on the mechanism. The head 3 is provided with a shiftable rod 12 which may be vertically shifted by suitable means, hand power or motor power, and shown herein as a hand lever 13 operating a pinion 14, the teeth of which mesh with the teeth of a rack formation 15 on the rod 12.

On the lower end of the rod 12 is an abutment 16, and a coil spring such as is illustrated at 20 is designed to be placed under load by the shifting of the head 16 downwardly toward the post 10. On top of the post 10, as shown in detail in Fig. 2, is what may be termed a cradle structure for supporting the spring. This takes the form of a member 21 having a recess of spherical formation, and which may be centered on the post by a centering stud 22. A multiplicity of balls in a partially spherical retainer are disposed in the recess, as shown at 23, while the spring support per se has a partially spherical member 24 cradled in the ball formation. A platform 25 is mounted on the partially spherical member 24 as by means of a screw which may also secure a spring centering disc 26. A ring 27 may be placed outside the member 21 and insulated therefrom as indicated at 28, and an adjustable collar 30 is screwthreaded to the outside of this ring.

When a spring is placed on the platform 25, as shown in Fig. 2, and the handle 13 pulled downwardly, the head 16 moves down and engages the spring. Continued movement of the handle places the spring under compression load, and this load is thereby transmitted to the weighing mechanism within the housing 4, causing a rotary shift of the dial 5 and arms 7 in accordance with the load placed thereon.

While the dial indicates the load transmitted by the spring, it does not indicate the movement of the head 16. The movement of the head 16 determines the linear extent to which the spring is compressed. Now the thought is, to test the spring from this standpoint, that when it is compressed into a certain dimension the spring shall exert a certain load.

To this end means are provided which shift with the head 16 and serve to make and break certain electrical contacts. As shown in Fig. 3, an arm 31 is carried by the post 12, and in the arm is a sleeve 32 which can be adjusted and maintained adjusted by a set screw 33. A coil spring 34 cooperates in this adjustment and tends to shift the sleeve 32 upwardly. Therefore, adjustment may be made by pushing the sleeve against the action of the spring 34 and then tightening the set screw and then by further setting the nut 35. Within the sleeve 32 is another sleeve of insulation 36 also adjustable, which adjustment may be maintained by a thumb screw 37. A contact member 38 is carried at one end of the insulating sleeve, while slidable in the sleeve is a conductor pin 39 having a head 40 for engaging the contact 38.

In Fig. 4 another form of make and break device is indicated, also carried by the arm 31 and having a sleeve 32a mounted in the same manner as disclosed in Fig. 3, the reference characters being the same, except for the addition of the letter a, while in the sleeve 32a is an insulating sleeve 38a and a conductor pin 39a with a terminal piece or head 40a. The movable scale plunger 10, as shown in Figs. 3 and 4, carries a contact for each of the pins as indicated at 41 and 41a.

Now as shown in Figs. 1 and 7, there are three contact pins, the pins 39 and 39a being shown in detail in Figs. 3 and 4, and the pin 39b being identical in function as the pin 39 and having the same parts which bear the same reference characters except for the addition of the latter b.

In testing a spring the head 21 is pulled downwardly to place it under compression. As the spring creates an angular load, the cradled platform 25 shifts angularly as shown in Fig. 2, and if the angle is sufficiently great the platform 25 contacts with the edge of the ring 30. This makes an electrical contact and indicates that the particular spring is objectionable. By adjusting the ring 30 on its screwthreads upwardly as Fig. 2 is viewed, the less is the angular load permitted. By adjusting the ring 30 downwardly say from the platform 25 the greater is the angular load permitted. Thus a user may adjust the apparatus to get as fine a test on the springs from this standpoint as the user desires. As the loading head 16 moves downwardly, placing a spring under load, the pin 39 first contacts with contact 41 and a circuit is completed through the pin, contact 41 and contact 38. This lasts momentarily until the head 40 lifts from the contact 38 and the circuit is broken. Subsequently the pin 39b, which has a higher adjustment as shown in Fig. 7, contacts with its contact member 41b and a circuit is made through the pin 39b and its contacts 40b and contact ring 38b. The circuit through the platform 25 and ring 30 passes through the pin 39a so that normally when the machine is unloaded the rocking of the member 25 does not close the circuit, since the pin 39a is lifted from its contact 41a. The rocking center is located substantially in the plane of the end of the spring in contact with the support 25. As the machine is operated, however, the pin 39a, having once made contact with the contact 41a, maintains the circuit closed at this point.

The indicating mechanism from which readings may be taken may take the form of a box or container 50 having a light 51 and light 52 and a switch 53 for making the circuits so that the machine is ready for operation. One line extends from the box as at 54 to an arm 55 frictionally mounted on the pinion shaft and arranged to make contact with a contact 56 as the lever 13 is pulled downwardly and this line 54 then extends to the contacts 41 and 41b. A ground line 60 extends from the box to the post 10. A line 57 extends from the box to the contact ring 38 of the pin 39 and then to the contact ring 38b. Another line 61 extends from the box to the head 40a of the contact pin 39a.

Mounted on the apparatus for cooperation with the head 8 is a light source and a light sensitive element. The light source is indicated at 70 and it passes its light through an aperture 71 in the casing 4 and within the casing is a light sensitive element diagrammatically illustrated at 72 in Fig. 7. In fact the light source, the aperture and the light sensitive element are all diagrammatically shown in Fig. 7. The lead lines 73 for the light sensitive element and the lead lines for the light source 74 may all extend through the conductor or cable 75.

When a spring is to be tested, it is placed on a platform 25. Oscillation of the platform may cause it to contact with the ring 30 but this produces no action. As the lever 13 is pulled downwardly, the arm 55 contacts with 56 and closes the circuit at this point. Continued downward movement of the lever causes downward movement of the head 16 and with it the several contact pins. When the spring has been compressed so that it has a desired or known axial extent, the pin 39 contacts with the member 41 and the circuit is completed through the line 54 and the line 57. This would normally light the load lamp 51. But, in this compression of the spring, the dial 5 has been caused to shift counter-clockwise as Fig. 1 is viewed and, in accordance with the predetermined set of one arm 7, the head 8 blocks off the opening 71 so that the circuit through the pin 39 to the lamp 51 remains broken. Thus, there is no light appearing at 51.

At a predetermined time, say at about the time the pin 39 contacts with 41, the pin 39a contacts with 41a thus completing a circuit for the light 52 at this point. The circuit, however, also runs through the cradle platform 25 and ring 30 through the line 62 so that the light 52 is only energized when the spring is not square and causes the platform 25 to tip into contact with the ring 30. The light 52 is labeled SUL meaning, for example, square under load.

The engagement of the pin 39 is one position of load for the spring and now the apparatus is shifted further for a second position and upon this further shift the head 40 moves out of contact with the collar 38 although the pin 39a maintains the circuit closed at that point with the result that the spring squareness is ascertainable at all times. When the pin 39b strikes 41b, the circuit through the line 54 and 57 is again completed but, if the spring has the correct load capacity, the other head 8 will still be in the position to block off the aperture 71. Also at this time the circuit is made by the pin 39a so that, if the spring is not square, contact will be made between 25 and 30 and the light 52 illuminated indicating that the spring is not square and defective.

Briefly reiterating the load test: The degree to which the spring is compressed depends upon the movement of the head 16. In one predetermined position, the pin 39 closes the circuit. In another predetermined position, the pin 39b closes the circuit. If the capacity of the spring is satisfactory within desired limits, one of the heads 8 block off the aperture for the first reading and the other for the second reading. The arms may be angularly adjusted relative to each other for different loads. The circumferential extent of the heads determine the desired tolerances. Thus, if the light 51 is not energized, the spring is satisfactory under the prescribed limits as to load. The arm 7 may be adjusted angularly relative to the dial 5 and the circumferential extent of its head 8 may be varied for different tolerances. Any time the light 52 goes on, however, the spring is out of square and may be cast aside.

Thus, in operating the machine, the operator need only watch the lights 51 and 52. If no light becomes energized, the spring is satisfactory; if the light 51 goes on the spring does not have the desired load capacity at a predetermined compression and may be cast into one box or group for springs undesirable as to load; if the light 52 is energized that particular spring is defective as to its squareness and may be cast into another box or group and if both lights go on the spring is bad from both standpoints.

When the machine is opened after a test, the arm 55 moves away from 56 and the circuit is broken. The arm 55 then contacts with a pin 58 and stops further movement although its frictional arrangement on the pinion shaft permits the pinion to continue rotation.

A modified arrangement is shown in Fig. 6 where the head 8a has a large circumferential extent and normally blocks the opening 71 but has a slot 8' for uncovering the opening 71 in the desired range of spring test. Thus, when the pins 39 and 39b contact with their respective contact pieces, the light 51 will be energized and upon such energization it will be known to the operator that the spring is satisfactory.

The device may be arranged to test the load capacity of other elements and, for example in Fig. 5, the head 16a and the support 25a are arranged to receive a piston ring 75. With this arrangement, the expanding tendency of a piston ring under a predetermined compression can be ascertained and thus pressure of the piston ring on the piston walls of an engine reduced to knowledge.

The electrical circuits for the lamps are illustrated somewhat diagrammatically in Fig. 7. The power supply box is shown at 80, and the line 74 to the light source 70, which may be of low voltage, leads therefrom. An electronic circuit arrangement is generally shown at 81 into which the line 73 from the light sensitive element leads. Low voltage filament supply lines run to the electronic circuit 81 as shown at 82, and also to an electronic circuit arrangement 83. High voltage lines 84 also lead to the electronic circuits, while a high voltage line 85 leads to the two lamps 51 and 52. The lamps are connected to the electronic circuit by leads 86 and 87. The line 61 which leads to the needle 39a extends to the electronic circuit 83. The line 57 from the load needles extends to the electronic circuit 81 as does also the line 54.

In operation, the contact at 55 and 56 is first made and this completes a circuit through 54 to the ground 60, and sets the electronic circuit 81 into operation When the needle 39 makes contact at 41 the circuit for the electronic circuit 81 is closed through the line 54 and the line 57. This normally causes the electronic circuit to set up a current through line 87 and line 85 to energize the light 51. But if the controlling light sensitive element 72 is not subjected to light, then no current flows through the lines 85 and 87. The light sensitive element 72 is shielded from the lamp 70 by the head 8 when the spring load is within the proper tolerances. This condition of the circuit through the lines 54 and 57 is only momentary. If the lamp 51 is not lighted then the spring is further compressed until the pin 39b again closes the circuit for the electronic circuit 81 through the same lines 54 and 57. And again the light 51 will only be energized if the spring is improper and the other head 8 does not shield the sensitive element 72. Throughout the range of tests the pin 39a contacts at 41a and closes the circuit for the electronic circuit 83 through line 61 and to the ring 30. The circuit is broken at this point until the platform rocks and contacts the ring 30 when the circuit is closed through 60 to the ground. Any time a spring is out of squareness the platform is rocked, the circuit closed and the electronic circuit 83 set into action, causing the lamp 52 to be energized to thus indicate the lack of squareness of the spring under test.

I claim:

1. In an apparatus for testing springs, the combination of weighing means having a movable support for a spring and having an element which moves in accordance with the movement of the support incident to a load thereon, a head for engaging the spring which is positioned on said support, means for shifting the head to compress the spring and place a load on the support, a load indicating lamp, a controlling circuit therefor including a light source and a light sensitive element, a circuit for the indicating lamp including a fixed contact and a contact mounted on said head arranged to momentarily close the circuit when the spring has been flexed a predetermined extent, said circuit including a second fixed contact and a second contact on the head for engagement when the spring has been further flexed a predetermined extent, and means on said movable element for shielding and exposing the light sensitive element to said light source and co-related with the said head to control the operation of the indicating lamp in accordance with the load exerted on the platform by the spring when the same is compressed to said predetermined extents.

2. In an apparatus for testing springs, the combination of weighing means having a movable support for a spring and having an element which moves in accordance with the movement of the support incident to a load thereon, a head for engaging the spring which is positioned on said support, means for shifting the head to compress the spring and place a load on the support, a load indicating lamp, a controlling circuit therefor including a light source and a light sensitive element, a circuit for the indicating lamp including a fixed contact and a contact mounted on said head arranged to momentarily close the circuit when the spring has been flexed a predetermined extent, said circuit including a second fixed contact and a second contact on the head for engagement when the spring has been further flexed a predetermined extent, means on said movable element for shielding and exposing the light sensitive element to said light source and co-related with the said head to control the operation of the indicating lamp in accordance with the load exerted on the platform by the spring when the same is compressed to said predetermined extents, another indicating lamp with a circuit therefor, contact means associated with the said head for closing the last mentioned circuit substantially throughout the range of movement of the head between the predetermined extents of compression of the spring, means for rockably mounting the platform, and contact means in the last mentioned circuit closed by the rocking of the platform incident to lack of sqaureness in the spring for energizing the second indicating lamp.

HERBERT W. LINK.